(12) United States Patent
Wang

(10) Patent No.: US 9,891,469 B2
(45) Date of Patent: Feb. 13, 2018

(54) ARRAY SUBSTRATE, LIQUID CRYSTAL DISPLAY PANEL AND DISPLAY DEVICE

(71) Applicant: BOE TECHNOLOGY GROUP CO., LTD., Beijing (CN)

(72) Inventor: Yingtao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/037,879

(22) PCT Filed: Dec. 29, 2015

(86) PCT No.: PCT/CN2015/099338
§ 371 (c)(1),
(2) Date: May 19, 2016

(87) PCT Pub. No.: WO2017/020518
PCT Pub. Date: Feb. 9, 2017

(65) Prior Publication Data
US 2017/0038640 A1    Feb. 9, 2017

(30) Foreign Application Priority Data

Aug. 3, 2015 (CN) .......................... 2015 1 0483267

(51) Int. Cl.
*G02F 1/1335*     (2006.01)
*G02F 1/1368*     (2006.01)
*G02F 1/1362*     (2006.01)
*G02F 1/1343*     (2006.01)
*G02F 1/1333*     (2006.01)

(52) U.S. Cl.
CPC ...... *G02F 1/133555* (2013.01); *G02F 1/1368* (2013.01); *G02F 1/13439* (2013.01);
(Continued)

(58) Field of Classification Search
CPC ................................................. G02F 1/133555
See application file for complete search history.

(56) References Cited

U.S. PATENT DOCUMENTS

2001/0055082 A1* 12/2001 Kubo ................ G02F 1/133371
349/114
2006/0098144 A1* 5/2006 Chang ............... G02F 1/133555
349/114

(Continued)

FOREIGN PATENT DOCUMENTS

CN        101165564 A      4/2008
CN        101290446 A      10/2008
(Continued)

OTHER PUBLICATIONS

Search Report and Written Opinion dated Mar. 24, 2016 from State Intellectual Property of the P.R. China.
Chinese Office Action dated Jul. 28, 2017.

*Primary Examiner* — Wen-Ying P Chen
(74) *Attorney, Agent, or Firm* — Dilworth & Barrese, LLP.; Michael J. Musella, Esq.

(57) ABSTRACT

An array substrate, a liquid crystal display (LCD) panel and a display device are provided. The array substrate (10) includes a base substrate (100) and a plurality of subpixels (103) disposed on the base substrate (100), wherein an area of each of the subpixels (103) includes a plurality of transmissive regions (105) and a plurality of reflective regions (104).

16 Claims, 12 Drawing Sheets

(52) U.S. Cl.
CPC .. *G02F 1/133536* (2013.01); *G02F 1/134309* (2013.01); *G02F 1/136286* (2013.01); *G02F 1/133345* (2013.01); *G02F 1/134363* (2013.01); *G02F 2001/133548* (2013.01); *G02F 2001/134345* (2013.01); *G02F 2001/136295* (2013.01); *G02F 2201/121* (2013.01); *G02F 2201/123* (2013.01); *G02F 2203/09* (2013.01)

(56) References Cited

U.S. PATENT DOCUMENTS

| | | | |
|---|---|---|---|
| 2008/0002071 A1 | 1/2008 | Park | |
| 2008/0100781 A1* | 5/2008 | Choo | G02F 1/133536 349/96 |
| 2008/0204636 A1* | 8/2008 | Ge | G02F 1/133345 349/114 |
| 2009/0109377 A1 | 4/2009 | Sawaki et al. | |

FOREIGN PATENT DOCUMENTS

| | | |
|---|---|---|
| CN | 101354490 A | 1/2009 |
| CN | 101452160 A | 6/2009 |
| CN | 101520563 A | 9/2009 |
| CN | 103995405 A | 8/2014 |
| CN | 104049400 A | 9/2014 |
| CN | 104330915 A | 2/2015 |
| CN | 104503165 A | 4/2015 |
| CN | 104991377 A | 10/2015 |

* cited by examiner

ARRAY SUBSTRATE, LIQUID CRYSTAL DISPLAY PANEL AND DISPLAY DEVICE

TECHNICAL FIELD

Embodiments of the present invention relate to an array substrate, a liquid crystal display (LCD) panel and a display device.

BACKGROUND

With the rapid development of display technology, there is a growing emphasis on the application and innovation of displays. Of course, the requirements on display properties are also higher and higher. In a general transmissive LCD, images will have erosion phenomenon under direct sun. Thus, people constantly seek for a method in which the display has good contrast no matter indoors or outdoors.

Transflective technology has been one proposal for solving the problem of reduced contrast outdoors. However, there are mainly two means for achieving the transflective technology. One is single-cell-gap electrically controlled birefringence (ECB) mode, but this mode generally requires an additional compensating film and has poor viewing angle. The other is double-cell-gap transflective mode, but this mode has the disadvantages of complex manufacturing process, high manufacturing cost and poor display properties.

SUMMARY

At least one embodiment of the invention provides an array substrate, a liquid crystal display panel and a display device, which can enable the display panel and the display device including the array substrate according to the embodiment of the invention having more uniform brightness, and improved uniformity as a whole.

At least one embodiment of the invention provides an array substrate, comprising a base substrate and a plurality of subpixels disposed on the base substrate, wherein an area of each of the subpixels includes a plurality of transmissive regions and a plurality of reflective regions.

For example, in the array substrate provided by one embodiment of the invention, the transmissive regions and the reflective regions are alternately arranged in a first direction.

For example, in the array substrate provided by one embodiment of the invention, the transmissive regions and the reflective regions are alternately arranged in a second direction which is perpendicular to the first direction.

For example, in the array substrate provided by one embodiment of the invention, wherein the plurality of transmissive regions and/or the plurality of reflective regions in the area of each of the subpixels are uniformly distributed in the each of the subpixels.

For example, in the array substrate provided by one embodiment of the invention, wherein each of the subpixels is provided with a wire grid polarizer (WGP); the WGP in each of the subpixels includes a plurality of groups of metal wires in parallel arrangement disposed in the plurality of reflective regions; each reflective region is provided with one group of metal wires in parallel arrangement; and the plurality of metal wires in parallel arrangement in the WGP are configured to transmit linearly polarized light with a polarization direction perpendicular to an extension direction of the metal wires and reflect linearly polarized light with a polarization direction parallel to the extension direction of the metal wires.

For example, in the array substrate provided by one embodiment of the invention, wherein the metal wires are made of at least one selected from the group consisted of aluminum, chromium, copper, silver, nickel, iron and cobalt.

For example, in the array substrate provided by one embodiment of the invention, further comprising a plurality of data lines, wherein the WGP and the plurality of data lines are arranged in a same layer and insulated from each other.

For example, in the array substrate provided by one embodiment of the invention, further comprising a plurality of gate lines, wherein the WGP and the plurality of gate lines are arranged in a same layer and insulated from each other.

For example, in the array substrate provided by one embodiment of the invention, further comprising common electrode lines which are arranged in a same layer and have a same extension direction with the gate lines, wherein the WGP in each of the subpixels is electrically connected with the common electrode lines.

For example, in the array substrate provided by one embodiment of the invention, wherein the WGP in each of the subpixels is electrically connected with a pixel electrode in the each of the subpixels.

For example, in the array substrate provided by one embodiment of the invention, further comprising a thin film transistor, wherein the WGP is multiplexed as a pixel electrode in each of the subpixels; and the pixel electrode is electrically connected with a drain electrode of the thin film transistor.

For example, in the array substrate provided by one embodiment of the invention, wherein the pixel electrode in each of the subpixels is a slit electrode.

For example, in the array substrate provided by one embodiment of the invention, further comprising a common electrode, wherein the common electrode is disposed between the pixel electrode and the base substrate.

For example, in the array substrate provided by one embodiment of the invention, wherein the WGP in each of the subpixels is multiplexed as a common electrode in the each of the subpixels.

For example, in the array substrate provided by one embodiment of the invention, wherein the common electrode in the each of the subpixel is a slit electrode or a comb electrode.

For example, in the array substrate provided by one embodiment of the invention, further comprising a pixel electrode and a thin film transistor, wherein the pixel electrode is disposed between the common electrode and the base substrate and electrically connected with a drain electrode of the thin film transistor.

For example, in the array substrate provided by one embodiment of the invention, wherein the WGP is multiplexed as a pixel electrode and a common electrode being arranged in a same layer and having an interdigital structure.

For example, in the array substrate provided by one embodiment of the invention, wherein in each of the subpixels, a transparent metal oxide conductive layer is disposed on the WGP.

For example, in the array substrate provided by one embodiment of the invention, wherein in each of the subpixels, the transparent metal oxide conductive layer and the WGP have a same pattern.

At least one embodiment of the invention provides a liquid crystal display (LCD) panel, comprising: an array substrate and a counter substrate which are arranged opposite to each other, and a liquid crystal layer filled between the array substrate and the counter substrate, the array substrate being the array substrate provided by any embodiment of the invention.

For example, in the LCD panel provided by one embodiment of the invention, each of the subpixels is provided with a WGP; the WGP in each of the subpixels includes a plurality of groups of metal wires in parallel arrangement disposed in the plurality of reflective regions; each reflective region is provided with one group of metal wires in parallel arrangement; the plurality of metal wires in parallel arrangement in the WGP are configured to transmit linearly polarized light with a polarization direction perpendicular to an extension direction of the metal wires and reflect linearly polarized light with a polarization direction parallel to the extension direction of the metal wires; a lower polarizer is disposed on one side of the array substrate away from the counter substrate; the extension direction of the plurality of metal wires in parallel arrangement is parallel to a direction of a polarization axis of the lower polarizer.

At least one embodiment of the invention provides a display device comprising the LCD panel provided by any embodiment of the invention.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

REFERENCE NUMERAL OF THE ACCOMPANYING DRAWINGS

10—array substrate; 20—counter substrate; 30—liquid crystal layer; 100—base substrate of the array substrate; 101—data line; 102—gate line; 103—subpixel; 1081—drain electrode; 1082—source electrode; 1083—active layer; 1084—gate electrode; 1085—gate insulating layer; 104—reflective region; 105—transmissive region; 106—WGP; 107—common electrode line; 116—metal wire; 121—first insulating layer; 122—second insulating layer; 123—common electrode; 1231—strip electrode; 1233—terminal electrode; 124—pixel electrode; 1241—strip electrode; 1242—slit; 1243—terminal electrode; 125—through hole; 130—lower polarizer; 140—backlight module; 1301—polarization axis of the lower polarizer; 200—base substrate of the counter substrate; 230—upper polarizer; 2301—polarization axis of the upper polarizer.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

In view of controlling the backlight power and the outdoor display properties, many LCDs adopt the transflective mode and utilize reflective regions to reflect ambient light to achieve the effect of luminance compensation. Generally, a display area is divided into reflective regions and transmissive regions, in which the transmissive regions achieve display via backlight emission and the reflective regions achieve display by reflecting the ambient light. Thus, under the environment with strong outdoor light, the display effect can be compensated by adoption of the reflective regions to reflect light.

In the transflective mode in which a wire grid polarizer (WGP) is taken as the reflective regions, one subpixel can only include one reflective region and one transmissive region, so the display properties may be poor, e.g., the brightness is nonuniform.

Figure 1A:
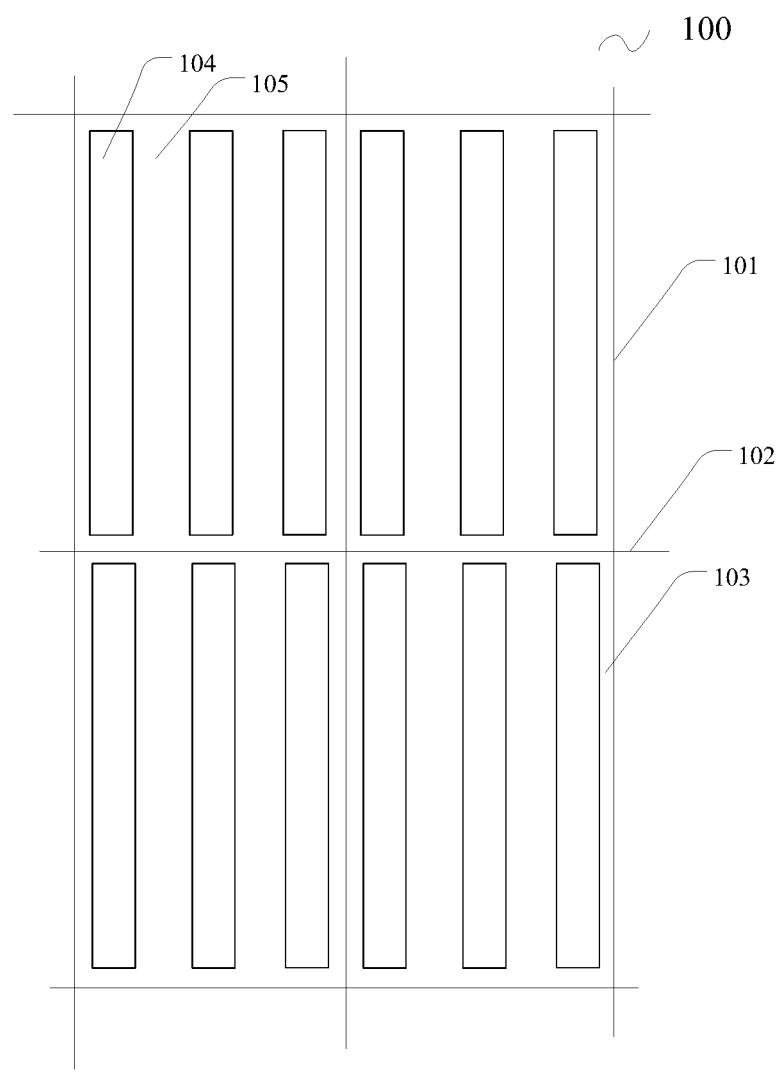
FIG. 1a is a schematic top view of an array substrate provided by one embodiment of the present invention, in which an area of one subpixel includes a plurality of transmissive regions and a plurality of reflective regions.

The embodiment of the present invention provides an array substrate, which, as illustrated in FIG. 1a, comprises a base substrate 100 and a plurality of subpixels 103 disposed on the base substrate 100. For instance, as illustrated in FIG. 1, the base substrate 100 is provided with a plurality of data lines 101 and a plurality of gate lines 102 which are intersected with and insulated from each other, and a plurality of subpixels 103 arranged in an array may be defined by the plurality of data lines 101 and the plurality of gate lines 102 on the base substrate 100. It should be noted that the subpixels 103 may be defined by the plurality of gate lines and the plurality of data lines and the present invention is not limited thereto. One subpixel 103, for instance, includes one gate line, one data line, one pixel electrode and one switching element. The subpixel 103 is a minimum display unit in the array substrate.

The subpixel 103 includes a plurality of transmissive regions 105 and a plurality of reflective regions 104 (not limited to the specific number respectively shown in the figures). For instance, the plurality of transmissive regions 105 does not have common sides, and the plurality of reflective regions 104 does not have common sides. "Do not have common sides", for instance, refers to that patterns formed by the transmissive regions and patterns formed by the reflective regions do not have common sides.

For instance, compared with a display mode in which one subpixel include one transmissive region and one reflective region, in the embodiment of the present invention, an area of the subpixel includes a plurality of transmissive regions and reflective regions, so that the display panel and the display device comprising the array substrate provided by the embodiment of the present invention can have more uniform brightness and good overall uniformity. Moreover, good brightness uniformity can be obtained no matter indoors or outdoors.

For instance, as illustrated in FIG. 1a, in the subpixel 103, the transmissive regions 105 and the reflective regions 104 are alternately arranged in the first direction. In the first direction, a transmissive region 105 is disposed between two adjacent reflective regions 104, and a reflective region 104 is disposed between two adjacent transmissive regions 105.

The first direction is the horizontal direction parallel to the paper. The plurality in the embodiment of the present invention, for instance, refers to more than one. For instance, both the transmissive regions 105 and the reflective regions 104 may be strip-shaped, for instance, be rectangular regions. But the present invention is not limited thereto.

Figure 1B:
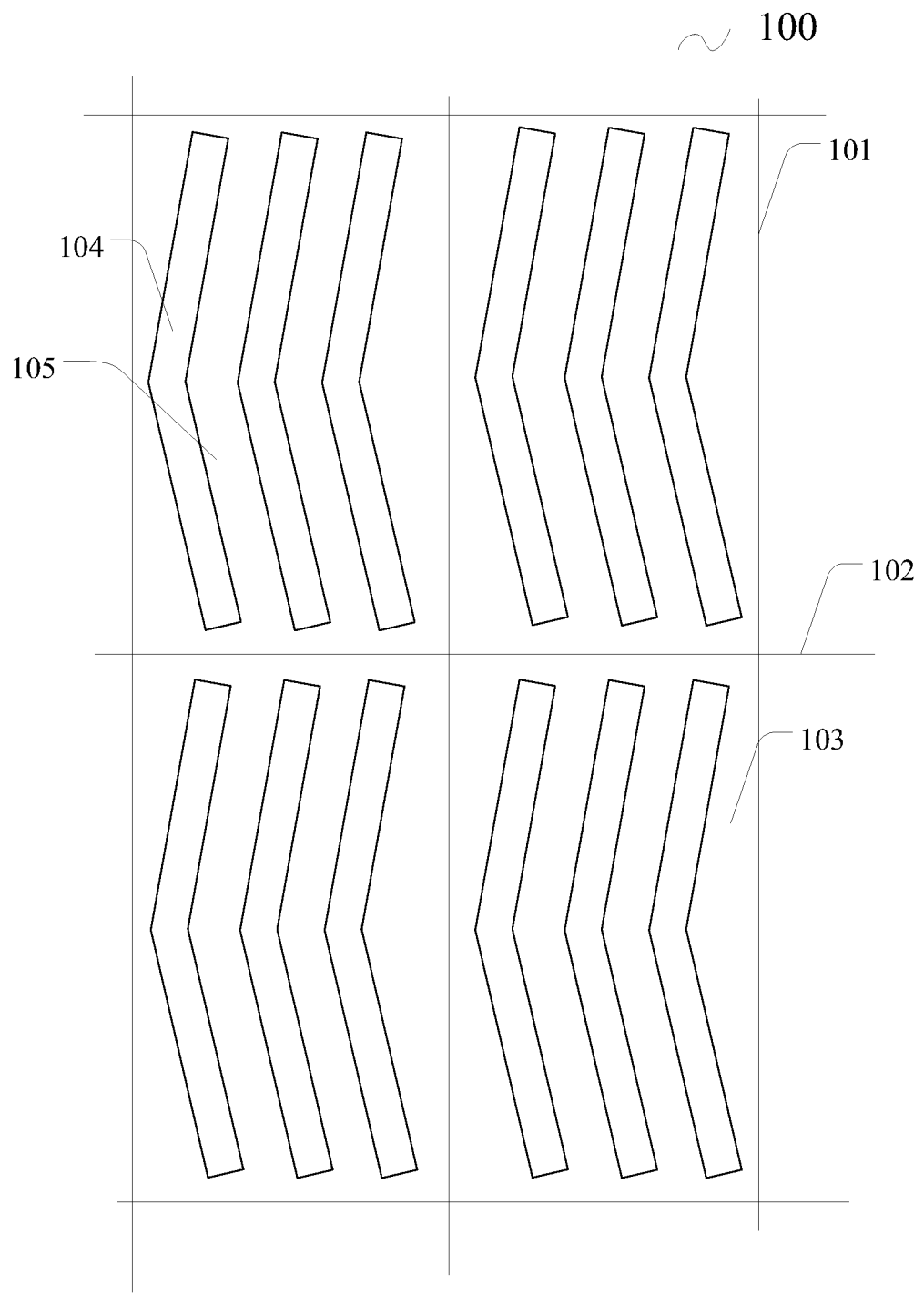
FIG. 1b is a schematic top view of an array substrate provided by another embodiment of the present invention, in which an area of one subpixel includes a plurality of transmissive regions and a plurality of reflective regions.

For instance, the transmissive region 105 and the reflective region 104 may also be in other shapes except the rectangular region. For instance, the reflective region 104 may be zigzagged, saw-toothed, circular, etc. The transmissive region 105 may be zigzagged, saw-toothed, circular, etc. FIG. 1b illustrates the case that both the transmissive regions 105 and the reflective regions 104 are zigzagged. No specific limitation will be given to the shape of the transmissive regions 105 and the reflective regions 104 in the embodiment of the present invention.

Figure 1C:
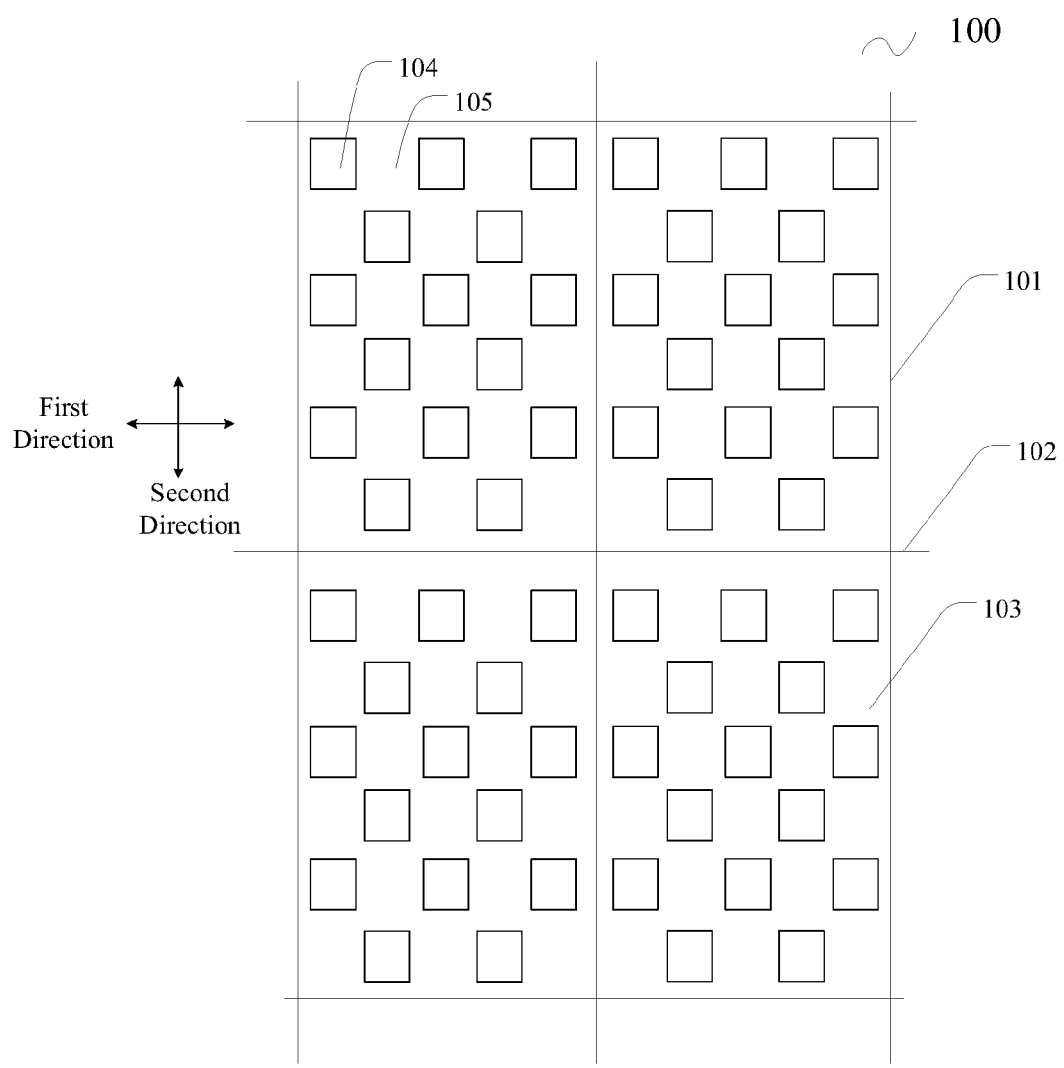
FIG. 1c is a schematic top view of an array substrate provided by another embodiment of the present invention, in which an area of one subpixel includes a plurality of transmissive regions and a plurality of reflective regions (the transmissive regions and the reflective regions are alternately arranged in both the first direction and the second direction)

For instance, as illustrated in FIG. 1c, in the subpixel 103, the transmissive regions 105 and the reflective regions 104 not only are alternately arranged in the first direction but also are alternately arranged in the second direction which is perpendicular to the first direction. As the transmissive regions 105 and the reflective regions 104 are alternately arranged in both the first direction and the second direction, the transmissive regions 105 and the reflective regions 104 can be more uniformly distributed. Thus, the brightness distribution uniformity of the display panel comprising the array substrate provided with the transmissive regions and the reflective regions of this type can be more improved.

Figure 1D:
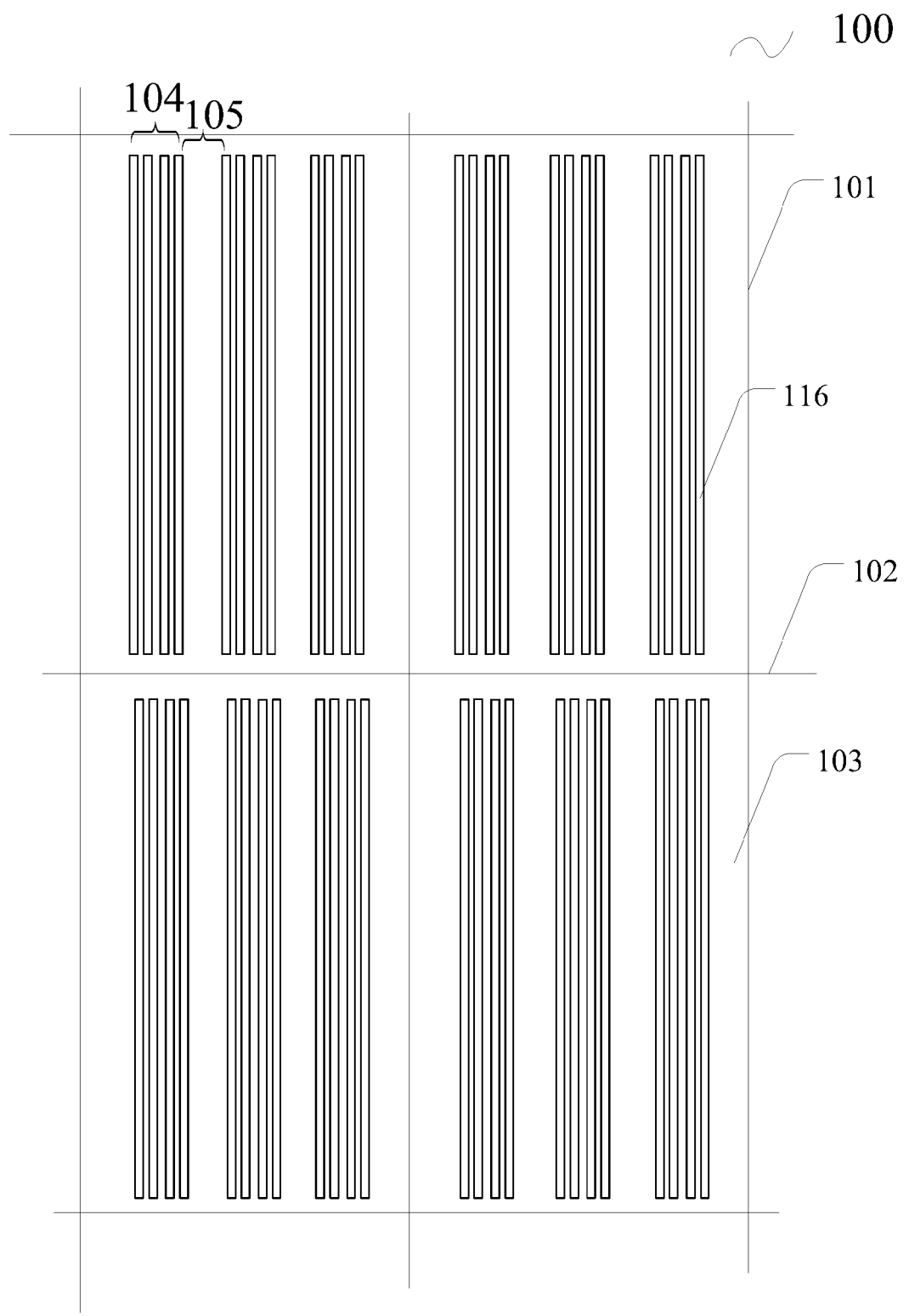
FIG. 1d is a schematic top view of an array substrate comprising a wire grid polarizer (WGP), provided by one embodiment of the present invention.
Figure 1E:
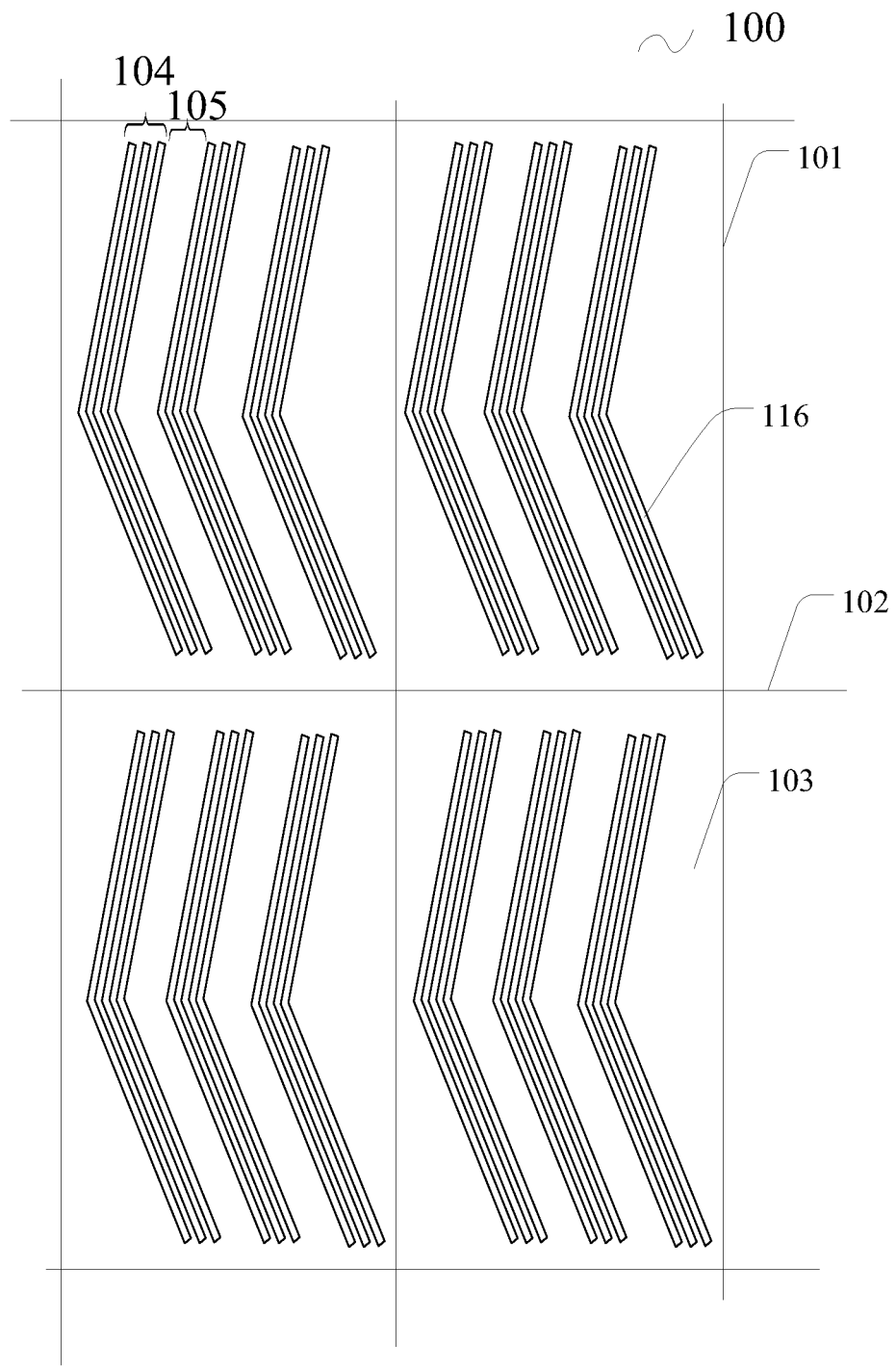
FIG. 1e is a schematic top view of an array substrate comprising a WGP, provided by another embodiment of the present invention.

For instance, as illustrated in FIG. 1d, the subpixel 103 is provided with a WGP 106. In the subpixel 103, the WGP 106 includes a plurality of groups of metal wires 116 in parallel arrangement disposed in the plurality of reflective regions 104; each reflective region 104 is provided with one group of metal wires in parallel arrangement; and the plurality of metal wires 116 in parallel arrangement in each reflective region 104 of the WGP 106 are configured to transmit linearly polarized light with a polarization direction perpendicular to the extension direction of the metal wires and reflect linearly polarized light with a polarization direction parallel to the extension direction of the metal wires. The plurality of metal wires in parallel arrangement is the WGP. FIG. 1d is a schematic diagram of a plurality of metal wires in parallel arrangement in each reflective region when both the transmissive regions and the reflective regions are rectangular. FIG. 1e is a schematic diagram of a plurality of metal wires in parallel arrangement in each reflective region when both the transmissive regions and the reflective regions are zigzagged.

It should be noted that both FIG. 1d and FIG. 1e illustrate the plurality of metal wires in parallel arrangement in each reflective region of the WGP by taking the case that the transmissive regions and the reflective regions are alternately arranged in the first direction as an example. For instance, the case that the transmissive regions and the reflective regions are alternately arranged in the second direction may refer to FIG. 1c and the case that the transmissive regions and the reflective regions are alternately arranged in the first direction.

Description is given in the embodiment of the present invention by taking the case that both the transmissive regions and the reflective regions are rectangular as an example.

For instance, as illustrated in FIGS. 1a to 1c, the plurality of transmissive regions and the plurality of reflective regions in the area of the subpixel are uniformly distributed in the subpixel. No limitation will be given here. The plurality of transmissive regions and/or the plurality of reflective regions may also be not uniformly distributed in the subpixel. When the plurality of transmissive regions and the plurality of reflective regions are uniformly distributed in the subpixel, the brightness uniformity of the display panel comprising the array substrate can be more improved.

It should be noted that the array substrate provided by the embodiment of the present invention comprises the subpixels provided with the plurality of transmissive regions and the plurality of reflective regions. For instance, all the subpixels in the array substrate each include the plurality of transmissive regions and the plurality of reflective regions. Or partial subpixels in the array substrate include the plurality of transmissive regions and the plurality of reflective regions. For instance, the array substrate provided by the embodiment of the present invention may further comprise subpixels of other types. For instance, the subpixels of other types do not include the plurality of transmissive regions and the plurality of reflective regions. When the array substrate comprises the subpixels of other types, the subpixels provided with the plurality of transmissive regions and the plurality of reflective regions may be uniformly distributed on the base substrate and may also be not uniformly distributed. When the subpixels provided with the plurality of transmissive regions and the plurality of reflective regions are uniformly distributed on the base substrate, the brightness uniformity of the display panel comprising the array substrate can be improved.

Figure 2A:
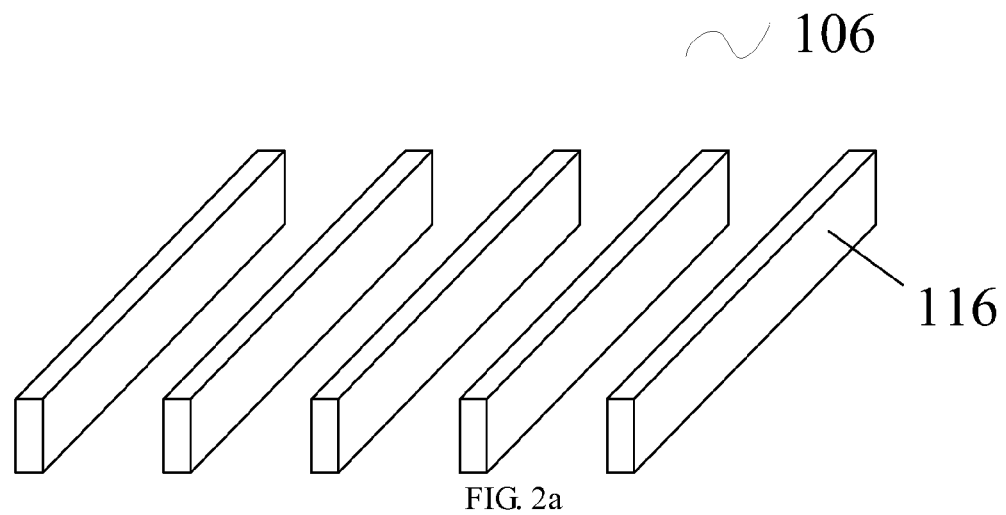
FIG. 2a is a schematic perspective view of a plurality of metal wires in parallel arrangement in a reflective region of the array substrate provided by one embodiment of the present invention.

For instance, in the array substrate, the plurality of metal wires 116 in parallel arrangement in the reflective region 104 may be as shown in FIG. 2a. Each reflective region 104 includes a plurality of metal wires 116 in parallel arrangement.

Figure 2B:
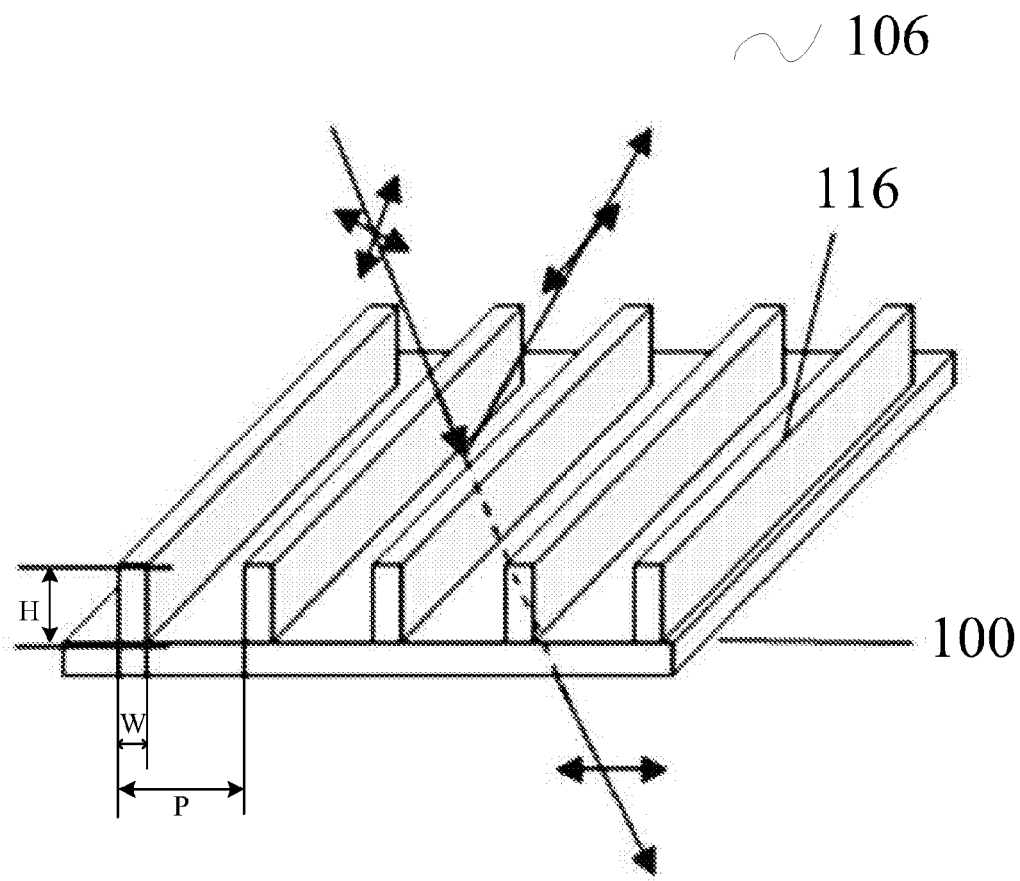
FIG. 2b is a schematic diagram illustrating the light transmission and reflection conditions of the plurality of metal wires in parallel arrangement in the reflective region of the array substrate provided by one embodiment of the present invention.

For instance, as illustrated in FIG. 2b, the properties of the WGP is as follows: as for natural light irradiated to the WGP, linearly polarized light parallel to the direction of the metal wires is almost totally reflected and linearly polarized light perpendicular to the direction of the metal wires may be transmitted.

For instance, in the WGP of the array substrate, as illustrated in FIG. 2b, the width of each metal wire may be 30 nm-50 nm.

For instance, in the WGP of the array substrate, as illustrated in FIG. 2b, the distance P between two adjacent metal wires may be 100-150 nm.

For instance, in the WGP of the array substrate, as illustrated in FIG. 2b, the height H of each metal wire may be 100-300 nm.

The plurality of metal wires in parallel arrangement in the WGP 106 of the array substrate provided by the embodiment of the present invention may be formed by processes such as deposition of a metallic film, photoresist coating, acquisition of a photoresist pattern via exposure and development, and etching by taking the photoresist pattern as a mask. For instance, the process of exposure and development may be completed by a laser interference exposure method. That is to say, laser with specified wavelength is irradiated to the photoresist from two directions at the angle θ to form interference fringes for exposure, and concave-convex grid structures with various spacing within the wavelength range of the applied laser may be obtained by the variation of θ. Thus, the plurality of metal wires in parallel arrangement of the WGP can be formed. Of course, the WGP can be also formed by other means such as nano-imprint. No detailed description will be given here. No limitation will be given to the form of forming the WGP.

For instance, in the array substrate provided by the embodiment of the present invention, the WGP is generally made from metallic materials. For instance, the metal wires are nanometer metal wires. For instance, the metallic materials may include one or a combination of more selected from the group consisted of aluminum (Al), chromium (Cr), copper (Cu), zinc (Ag), a nickel (Ni), iron (Fe) and cobalt (Co). For instance, the WGP may be separately formed by one metallic film. The WGPs may also be arranged in the same layer with the normal metal wires (e.g., the gate lines and the data lines) in the array substrate. The WGP separately formed by one metallic film may be disposed above or below the pixel electrode, may be electrically connected with the pixel electrode, and may also be not electrically connected with the pixel electrode. Thus, the WGPs and the data lines and the gate lines will not be superimposed. In different examples, the WGP may be set to be arranged in the same layer with and insulated from the data line or the gate line. Thus, the WGPs can be formed without adding new patterning process on the general process of manufacturing the array substrate. Therefore, the number of applied masks can be saved; the manufacturing process can be reduced; the manufacturing cost can be reduced; and the production efficiency can be improved.

Figure 3A:
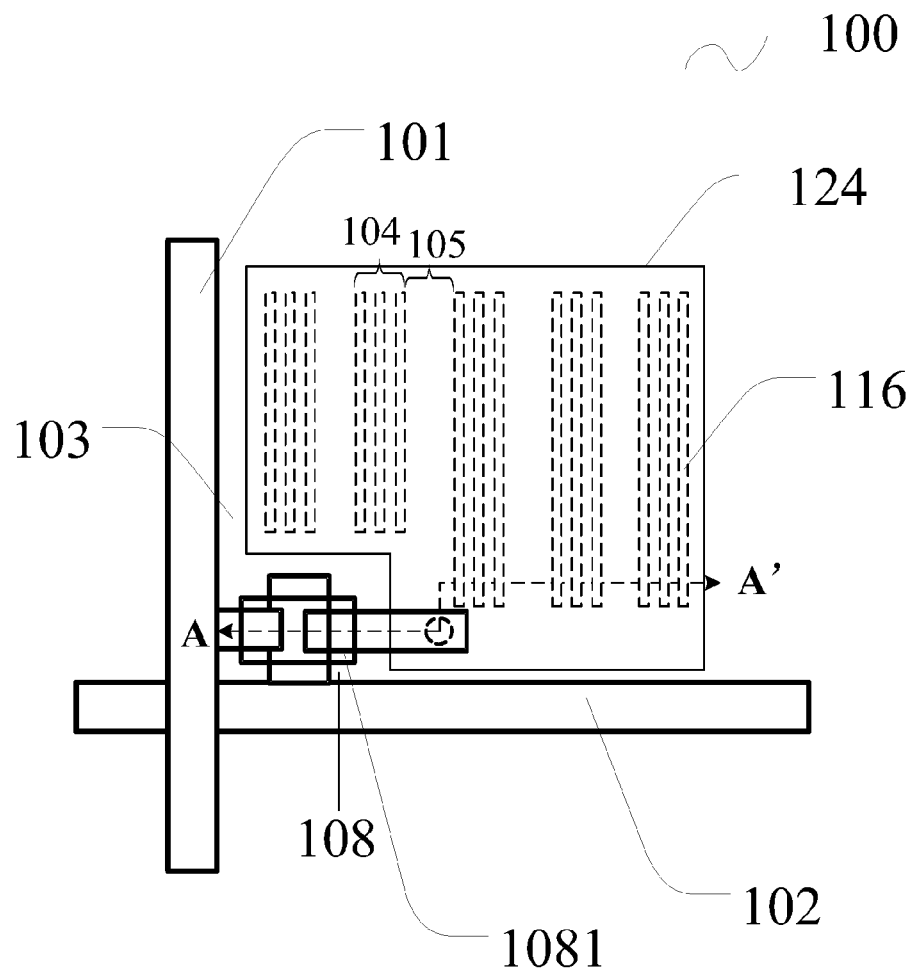
FIG. 3a is a schematic diagram of an array substrate comprising a WGP, provided by one embodiment of the present invention.

For instance, as illustrated in FIG. 3a, the array substrate comprises a base substrate 100 and a TFT 108, a data line 101, a gate line 102 and a subpixel 103 disposed on the base substrate 100. A WGP in the subpixel 103 includes a plurality of groups of metal wires 116 in parallel arrangement. The figure illustrates five groups of metal wires in parallel arrangements. But the plurality of metal wires in parallel arrangements is not limited to the five groups in the figure. A reflective region 104 is formed by each group of metal wires 116 in parallel arrangement, and a transmissive region 105 is disposed between two adjacent reflective regions 104. The plurality of metal wires 116 in parallel arrangement are not superimposed with both the data line and the gate line.

Figure 3B:
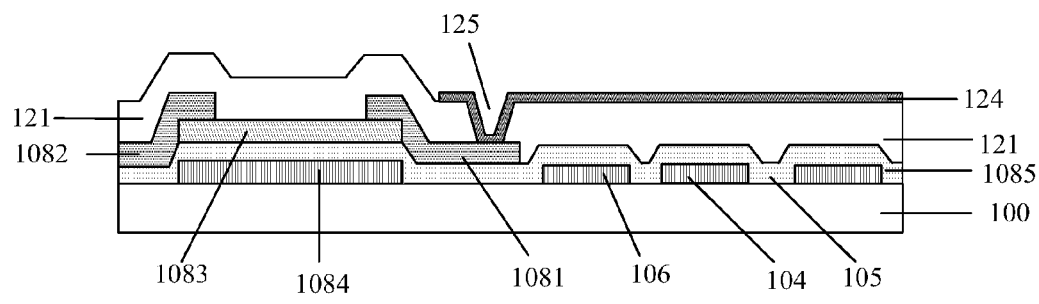
FIG. 3b is a schematic sectional view (the sectional view of FIG. 3a in the A-A' direction) of the array substrate provided by one embodiment of the present invention, in which the WGP and gate lines are arranged in the same layer.

For instance, FIG. 3b is a schematic sectional view in which WGP and the gate line are arranged in the same layer. A gate line 102 and a gate electrode 1084 are arranged in the same layer. The figure may be the sectional view of FIG. 3a in the A-A' direction. In the array substrate, the gate electrode 1084 and the WGP 106 are disposed on the base substrate 100. A gate insulating layer 1085 is disposed on a layer provided with the gate electrode 1084 and the WGP 106; an active layer 1083 is disposed on the gate insulating layer 1085; a source electrode 1082 and a drain electrode 1081 are disposed on a layer provided with the active layer 1083, are spaced from each other, are both connected with the active layer 1083, and are respectively disposed on both sides of the active layer 1083; a first insulating layer 121 is disposed on a layer provided with the drain electrode 1081 and the source electrode 1082; and a pixel electrode 124 is disposed on the first insulating layer 121 and electrically connected with the drain electrode 1081 of the TFT 108 via a through hole 125.

On this basis, the plurality of metal wires in parallel arrangement in the WGP of the array substrate provided by the embodiment of the present invention not only are taken as the reflective regions but also may be multiplexed as the pixel electrodes and the common electrodes or taken as storage capacitors. Description will be given below with reference to several specific embodiments.

First Embodiment

Figure 4A:
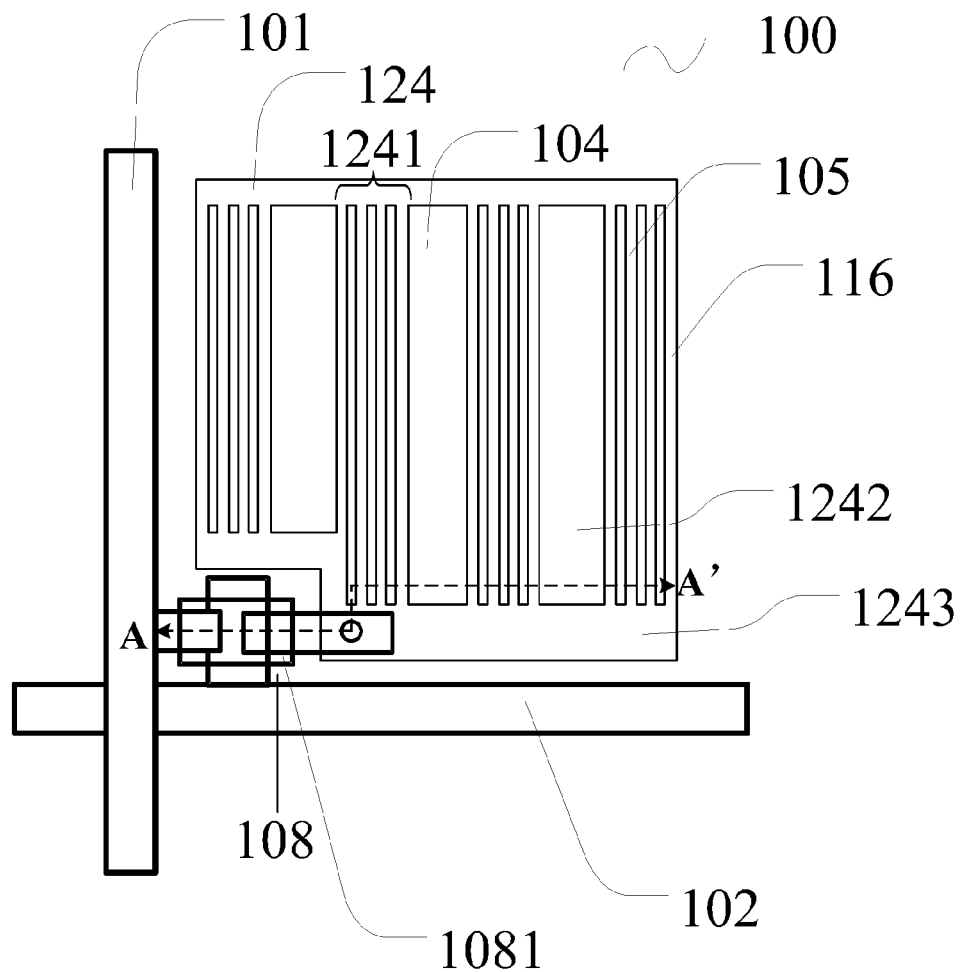
FIG. 4a is a schematic diagram of an array substrate provided by one embodiment of the present invention, in which a WGP is multiplexed as a pixel electrode.

In the embodiment, as illustrated in FIG. 4a, in the array substrate, a pixel electrode and a WGP are multiplexed. For instance, the WGP 106 in each subpixel is multiplexed as the pixel electrode which is electrically connected with a drain electrode 1081 of a TFT 108 disposed at an intersected position of a data line 101 and a gate line 102. The drain electrode 1081 is generally arranged in the same layer with the data line 101.

Figure 4B:
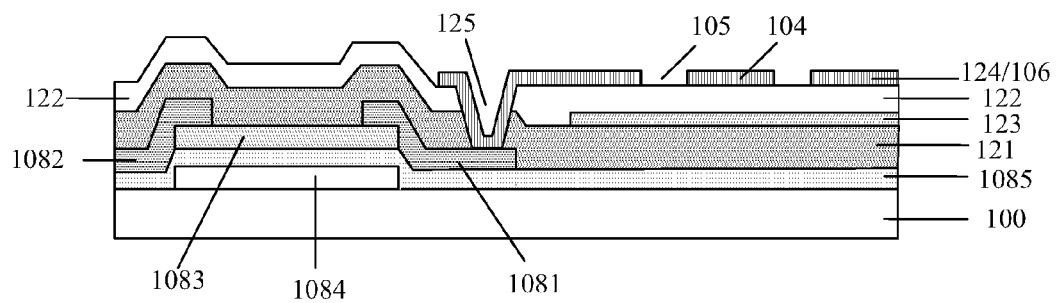
FIG. 4b is a schematic sectional view (the sectional view of FIG. 4a in the A-A' direction) of an advanced super dimension switch (ADS) mode array substrate provided by one embodiment of the present invention, in which a WGP is multiplexed as a pixel electrode.

For instance, in an ADS mode array substrate as shown in FIG. 4b, a gate electrode 1084 is disposed on a base substrate 100; a gate insulating layer 1085 is disposed on a layer provided with the gate electrode 1084; an active layer 1083 is disposed on the gate insulating layer 1085; a source electrode 1082 and a drain electrode 1081 are disposed on a layer provided with the active layer 1083, are spaced from each other, are both connected with the active layer 1083, and are respectively disposed on both sides of the active layer 1083; a first insulating layer 121 is disposed on a layer provided with the drain electrode 1081 and the source electrode 1082; a common electrode 123 is disposed on the first insulating layer 121; a second insulating layer 122 is disposed on a layer provided with the common electrode 123; and a pixel electrode 124 is disposed on the second insulating layer 122 and electrically connected with the drain electrode 1081 of the TFT 108 via a through hole 125. In the subpixel, the WGP 106 is multiplexed as the pixel electrode; each subpixel 103 includes a plurality of transmissive regions 105 and a plurality of reflective regions 104; and the transmissive regions 105 and the reflective regions 104 are alternately arranged (alternately arranged in the first direction). A transmissive region 105 is disposed between two adjacent reflective regions 104. A reflective region 104 is disposed between two adjacent transmissive regions 105.

For instance, as illustrated in FIG. 4a, the pixel electrode 124 is a slit electrode and includes a terminal electrode 1243 and a plurality of strip electrodes 1241 connected with the terminal electrode 1243, and a slit 1242 is formed between two adjacent strip electrodes 1241. The WGP in the subpixel is multiplexed as the slit pixel electrode. The WGP in the subpixel includes a plurality of groups of metal wires 116 in parallel arrangement. FIG. 4a illustrates four groups of metal wires 116 in parallel arrangement, but the plurality of metal wires 116 in parallel arrangement are not limited to the four groups in the figure. An area of each group of metal wires 116 in parallel arrangement is the reflective region 104. An area of the slit of the pixel electrode is the transmissive region 105. The plurality of metal wires 116 in parallel arrangement in the WGP 106 are configured to transmit linearly polarized light with a polarization direction perpendicular to the extension direction of the metal wires 116 and reflect linearly polarized light with a polarization direction parallel to the extension direction of the metal wires 116.

For instance, the width of one strip electrode in each pixel electrode (the width of the reflective region) may be 1.5-4 μm, and moreover, may be 2-3 μm. The distance between two adjacent strip electrodes of each pixel electrode (the width of the slit, the width of the transmissive region) may be 1-9 μm, and moreover, may be 2-8 μm, and furthermore, may be 3-7 μm.

For instance, as illustrated in FIG. 4b, the common electrode 123 is disposed between the pixel electrode 124 and the base substrate 100. In each subpixel, the common electrode, for instance, may be a plate electrode. The present invention is not limited thereto.

Figure 4C:
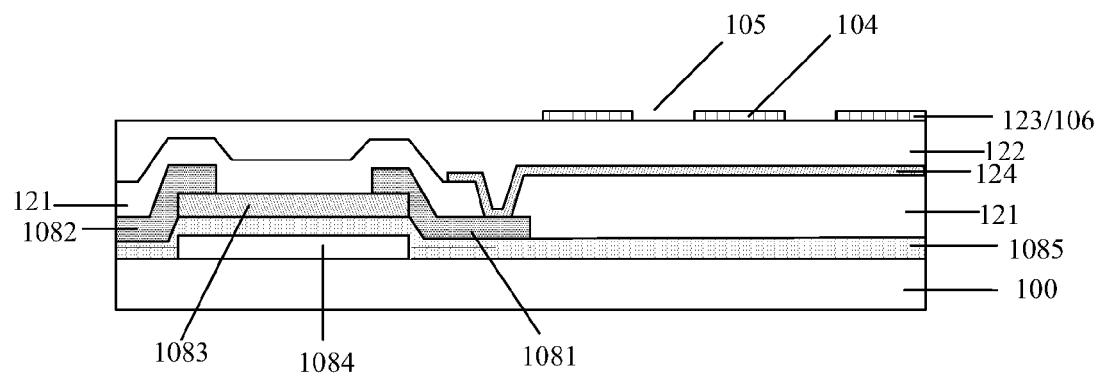
FIG. 4c is a schematic sectional view of an ADS mode array substrate provided by one embodiment of the present invention, in which a WGP is multiplexed as a common electrode.

As illustrated in FIG. 4c, in an ADS mode array substrate, the common electrode 123 may also be disposed above the pixel electrode 124, namely the pixel electrode 124 is disposed between the common electrode 123 and the base substrate 100. In this case, the WGP 106 may be multiplexed as the common electrode 123 in the subpixel 103.

Figure 4D:
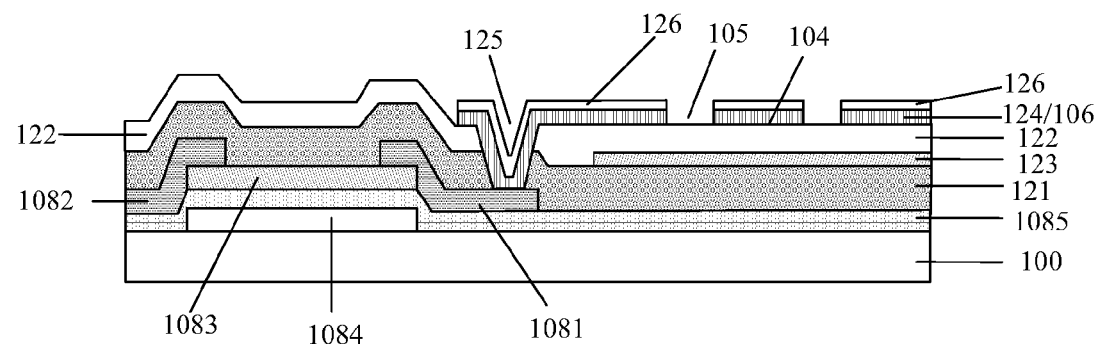
FIG. 4d is a schematic sectional view of an ADS mode array substrate provided by one embodiment of the present invention, in which a WGP is multiplexed as a pixel electrode and a transparent metal oxide conductive layer is disposed on the WGP.

When oxidizable metal such as Al is adopted to manufacture the WGP 106 multiplexed as the pixel electrode, as Al is oxidizable, in order to better prevent the manufactured WGP 106 from being oxidized, for instance, as illustrated in FIG. 4d, a transparent metal oxide conductive layer 126, e.g., an indium tin oxide (ITO) layer, may also be disposed on the WGP 106 in the subpixel. Moreover, as the transparent metal oxide conductive layer 126 disposed on the WGP 106 must be disconnected in the subpixel, the additional transparent metal oxide conductive layer 126 must be inevitably patterned, and hence the manufacturing process of the array substrate can be increased. In order to avoid increasing the manufacturing process of the array substrate, for instance, patterns of the transparent metal oxide conductive layer 126 and the WGP 106 in the subpixel may be set to be same. Thus, the patterns of the transparent metal oxide conductive layer 126 and the WGP 106 may be simultaneously formed by one patterning process without increasing the number of applied masks.

For instance, the pixel electrode is not limited to be a slit electrode, as long as the pixel electrode is provided with a plurality of transmissive regions and a plurality of reflective regions.

Figure 5:
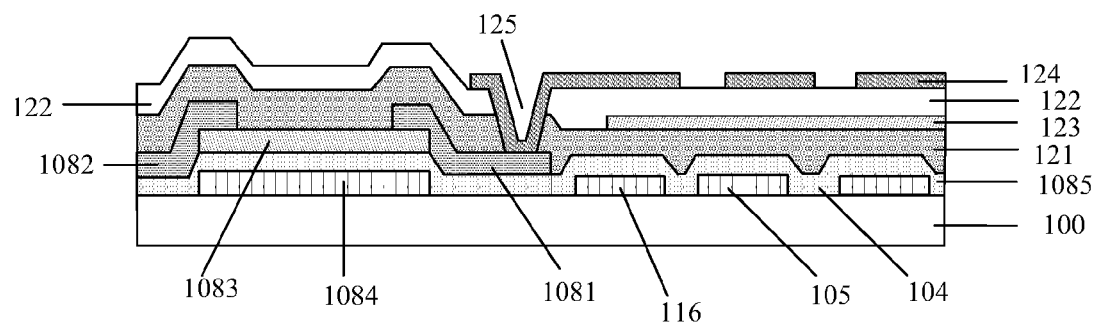
FIG. 5 is a schematic sectional view of an ADS mode array substrate provided by one embodiment of the present invention, in which a WGP and gate lines are arranged in the same layer.

For instance, the WGP may also be not multiplexed as the pixel electrode, for instance, may be arranged in the same layer with the gate line or the data line. For instance, as illustrated in FIG. 5, the gate line and the gate electrode are arranged in the same layer and pattered by the same metallic film, so the WGP is arranged in the same layer with the gate line and the gate electrode. In this case, in the subpixel 103, the transmissive regions 105 and the reflective regions 104 not only are alternately arranged in the first direction but also are alternately arranged in the second direction which is perpendicular to the first direction.

It should be noted that description is given in FIGS. 4b, 4c, 4d and 5 by taking the ADS mode array substrate as an example. But the present invention is not limited thereto. For instance, the array substrate provided by the embodiment of the present invention may also be an IPS mode, twisted nematic (TN) mode or vertical alignment (VA) mode array substrate.

For instance, in the TN mode or VA mode array substrate, the WGP may also be multiplexed as the pixel electrode. Similarly, in the TN mode or VA mode array substrate, the WGP may also be arranged in the same layer with a general metal wire. For instance, the WGP may be set to be arranged in the same layer with and insulated from the data line or the gate line.

Second Embodiment

Figure 6A:
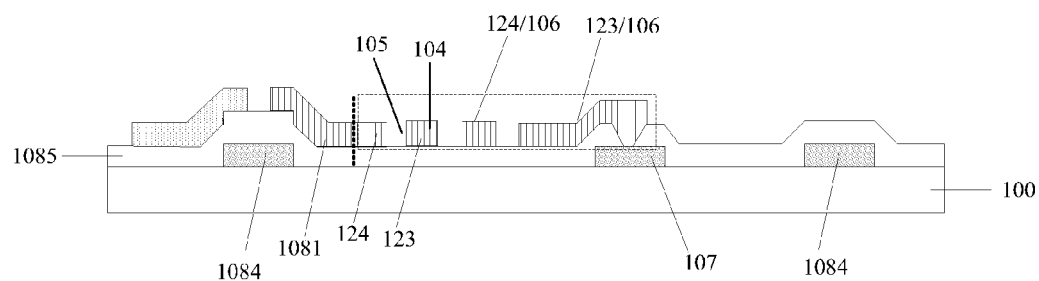
FIG. 6a is a schematic diagram of an in-plane switching (IPS) mode array substrate provided by one embodiment of the present invention, in which a WGP is multiplexed as a pixel electrode and a common electrode.
Figure 6B:
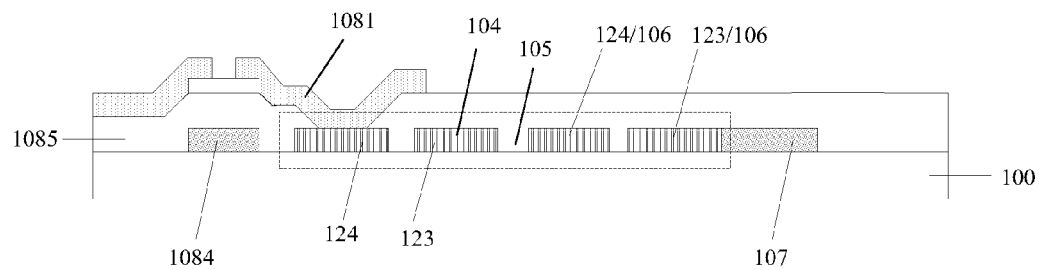
FIG. 6b is another schematic diagram of the IPS mode array substrate provided by one embodiment of the present invention, in which the WGP is multiplexed as the pixel electrode and the common electrode.

In the embodiment, as illustrated in FIGS. 6a and 6b, a pixel electrode and a common electrode and a WGP in an IPS mode array substrate are multiplexed. For instance, in the structure of the IPS mode array substrate, the pixel electrode and the common electrode in each subpixel are arranged in the same layer in an interdigital structure. Therefore, in the subpixel, the WGP 106 is multiplexed as the pixel electrode and the common electrode in the interdigital structure (e.g., the pixel electrode and the common electrode are fingerlike or comb-shaped); the WGP 106 multiplexed as the pixel electrode is electrically connected with a drain electrode 1081 of a TFT disposed at an intersected position of a data line 101 and a gate line 102; and the drain electrode 1081 may be arranged in the same layer with the data line 101. The subpixel 103 includes a plurality of transmissive regions 105 and a plurality of reflective regions 104, and the transmissive regions 105 and the reflective regions 104 are alternately arranged. The transmissive region 105 is disposed between two adjacent reflective regions 104. The reflective region 104 is disposed between two adjacent transmissive regions 105.

Figure 6C:
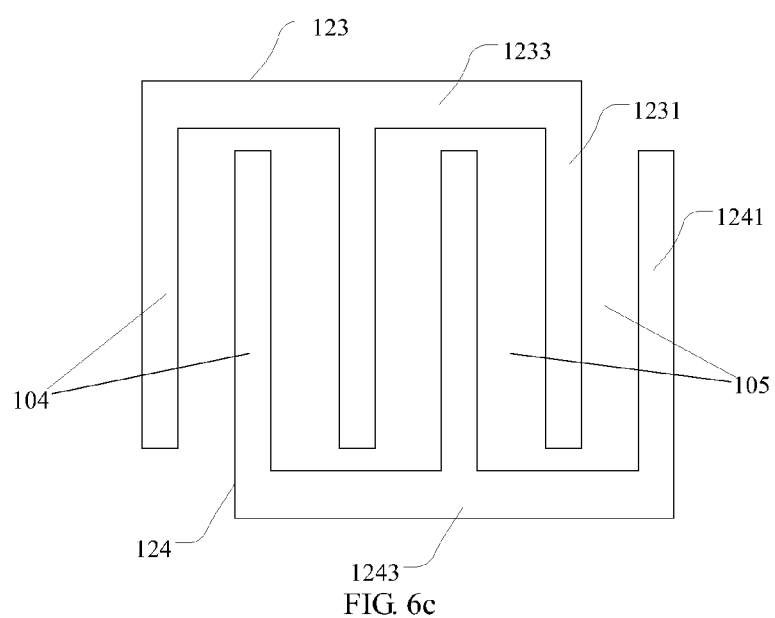
FIG. 6c is a schematic diagram of a pixel electrode and a common electrode being arranged in the same layer and having a interdigital structure.

As illustrated in FIG. 6c, the pixel electrode 124 of the interdigital structure includes a terminal electrode 1243 and a plurality of strip electrodes 1241 (the number of the strip electrodes is not limited to the number in the figure) connected with the terminal electrode 1243. The common electrode of the interdigital structure includes a terminal electrode 1233 and a plurality of strip electrodes 1231 (the number of the strip electrodes is not limited to the number in the figure) connected with the terminal electrode 1233. A plurality of groups of metal wires in parallel arrangement in the WGP 106 are combined to form the strip electrodes 1241 of the pixel electrode and the strip electrodes 1231 of the common electrode. For instance, areas of the plurality of strip electrodes 1241 and 1231 of the pixel electrode and the common electrode are reflective regions, and transmissive regions are disposed between the strip electrodes 1241 of adjacent pixel electrodes and between strip electrodes 1231 of the common electrode.

For instance, when the WGP 106 is arranged in the same layer with the data line 101, as illustrated in FIG. 6a, at this point, as the WGP 106 taken as the pixel electrode and the common electrode is arranged in the same layer with the drain electrode 1081 of the TFT, a portion of the WGP 106 taken as the pixel electrode 124 may be directly electrically connected with the drain electrode 1081; a portion of the WGP 106 taken as the common electrode 123 is connected with a common electrode line 107 via a through hole; and the common electrode line 107 may be arranged in the same layer with the gate line 102 and the gate electrode 1084. When the WGP 106 is arranged in the same layer with the gate line 102, as illustrated in FIG. 6b, at this point, as the WGP 106 taken as the pixel electrode and the common electrode is arranged in the same layer with the gate electrode 1084 of the TFT, a portion of the WGP 106 taken as the pixel electrode 124 is electrically connected with the drain electrode 1081 via a through hole, and a portion of the WGP 106 taken as the common electrode 123 is directly connected with the common electrode line 107 which may be arranged in the same layer with the gate line 102 and the gate electrode 1084.

For instance, in the process of manufacturing the IPS mode array substrate as shown in FIGS. 6a and 6b, the WGP 106 taken as the pixel electrode and the common electrode is set to be simultaneously manufactured with the data line 101 or the gate line 102, so the pixel electrode and the common electrode separately formed on the drain electrode can be saved, and hence the number of applied masks and the manufacturing process can be reduced.

Moreover, when the WGP 106 multiplexed as the pixel electrode and the common electrode is arranged in the same layer with the data line 101, no overcoat is disposed on the WGP 106 which is hence oxidizable. Therefore, in order to better prevent the manufactured WGP 106 from being oxidized, for instance, an oxide conductive layer may also be additionally arranged by the same means in the first embodiment, namely in the subpixel, a transparent metal oxide conductive layer, e.g., an ITO layer, is disposed on the WGP 106. Similarly, in order to avoid increasing the manufacturing process of the array substrate, for instance, in the subpixel, patterns of the transparent metal oxide conductive layer and the WGP 106 may also be set to be same.

Third Embodiment

In the embodiment, a WGP may be connected with a pixel electrode and may also be connected with a common electrode line and taken as one part of a storage capacitor.

For instance, when the pixel electrode is separately disposed in the subpixel (the WGP is not multiplexed as the pixel electrode), the WGP 106 in the subpixel may be electrically connected with the pixel electrode to form one part of the storage capacitor, so that the storage capacitance can be increased, and hence the display resolution of the device can be improved. Or when the common electrode line and the gate line in the array substrate are arranged in the same layer and have same extension direction, in the subpixel, the WGP 106 may be electrically connected with the common electrode line to form one part of the storage capacitor, so that the storage capacitance can be increased, and hence the display resolution of the device can be improved.

Figure 7:
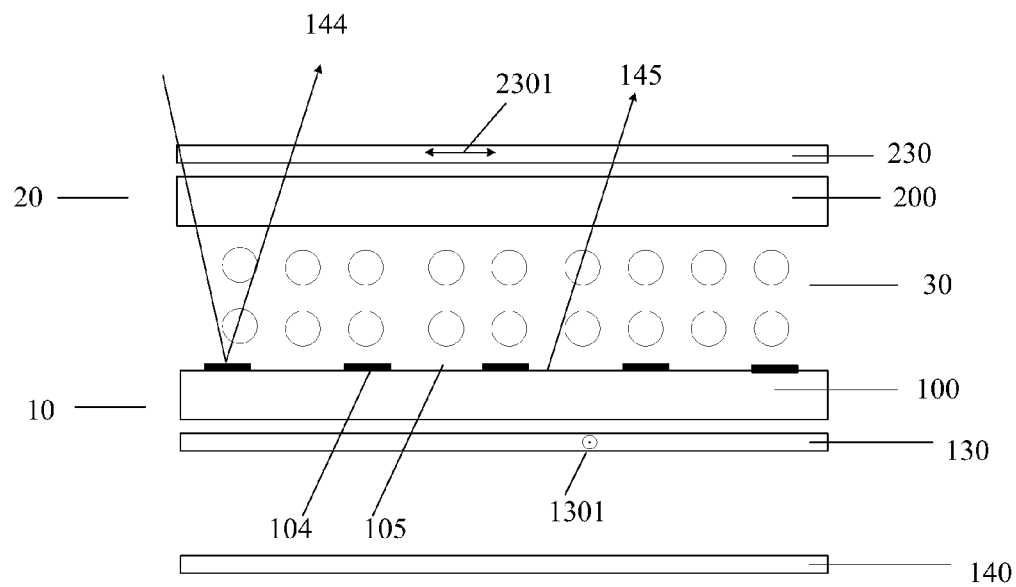
FIG. 7 is a schematic diagram of a display panel provided by one embodiment of the present invention.

The embodiment of the present invention further provides an LCD panel, which, as illustrated in FIG. 7, comprises an array substrate 10 and an counter substrate 20 arranged opposite to each other, and a liquid crystal layer 30 filled between the array substrate 10 and the counter substrate 20.

For instance, the array substrate 10 is any foregoing array substrate provided by the embodiment of the present invention.

For instance, the counter substrate and the array substrate are arranged opposite to each other and are respectively upper and lower substrates of the display panel; display structures such as a TFT array are generally formed on the array substrate; and CF resin is formed on the counter substrate. For instance, the counter substrate is a CF substrate. The counter substrate may include CF units corresponding to the subpixels on the array substrate and may also include black matrixes (BMs), etc.

For instance, as illustrated in FIG. 7, an upper polarizer 230 is disposed on one side of the counter substrate 20 away from the array substrate 10; a lower polarizer 130 is disposed on one side of the array substrate 10 away from the counter substrate 20; the subpixel 103 is all provided with a WGP 106 which may refer to the above description; and the extension direction of a plurality of metal wires in the WGP 106 is parallel to the direction of a polarization axis (transmission axis) of the lower polarizer 130. The polarizer only transmits light in the direction of the polarization axis.

In addition, as illustrated in FIG. 7, the LCD panel provided by the embodiment of the present invention may generally further comprise a backlight module 140 disposed on the outside of the array substrate. For instance, the backlight module may include an LED lamp component, a reflector and a light guide plate (LGP), and of course, may also include other components. No limitation will be given here.

The embodiment of the present invention further provides a display device, which comprises any foregoing LCD panel.

For instance, the display device may be: any product or component with display function such as a mobile phone, a watch, a tablet PC, a TV, a display, a notebook computer, a digital picture frame and a navigator. The embodiments of the display device may refer to the embodiments of the LCD panel. No further description will be given here.

For instance, as illustrated in FIG. 7, in the display panel or display device provided by the embodiment of the present invention, the directions of the polarization axes of the upper polarizer 230 and the lower polarizer 130 are perpendicular to each other. For instance, the direction of the polarization axis of the upper polarizer 230 is the x-axis direction, and the direction of the polarization axis of the lower polarizer 130 is the y-axis direction. The y axis is the direction perpendicular to the paper, and the x axis is the horizontal direction parallel to the paper. Thus, the extension direction of a plurality of metal wires in the WGP is parallel to the direction of the polarization axis of the lower polarizer 130, namely the extension direction of the plurality of metal wires is the y-axis direction. The initial alignment direction of liquid crystal molecules is the y-axis direction.

It should be noted that FIG. 7 only illustrates partial structures of the display panel or the display device and those not involved may refer to the above description or the conventional design.

Figure 8:
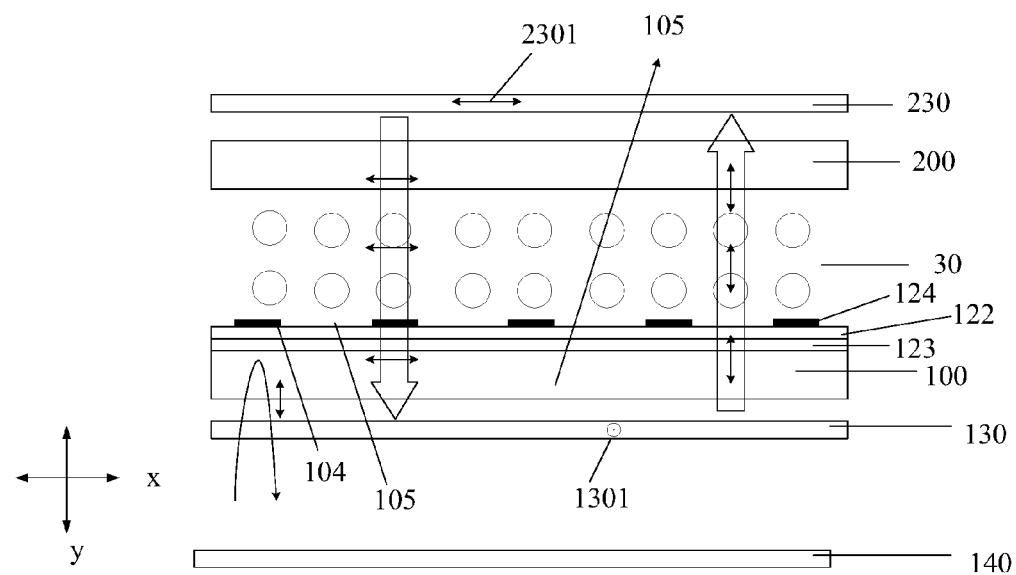
FIG. 8 is a schematic diagram of a method for achieving dark state in an ADS mode display panel or display device provided by one embodiment of the present invention.

Description will be given below to methods for achieving bright state and dark state in the display panel or the display device provided by the embodiment of the present invention. The method for achieving dark state is as shown in FIG. 8.

No voltage is applied to the liquid crystal cell, so the initial direction of the liquid crystal molecules is the y-axis direction. As for the reflective regions, ambient light is converted into linearly polarized light in the x direction after running through the upper polarizer, and the linearly polarized light in the x direction may run through the reflective regions and is finally absorbed when arriving at the lower polarizer, so no reflective light is produced, and hence the dark state is achieved. As for the transmissive regions, as the same with the conventional technology, the ambient light is converted into linearly polarized light in the x direction after running through the upper polarizer, and the linearly polarized light in the x direction may run through the transmissive regions (the transmissive regions may transmit natural light) and is finally absorbed when arriving at the lower polarizer, so no reflective light is produced, and hence the dark state is achieved.

As for the light from a backlight, the light is converted into linearly polarized light in the y direction when running through the lower polarizer; as for the reflective regions, the linearly polarized light in the y direction cannot run through the WGP (the extension direction of the plurality of metal wires in the WGP is parallel to the direction of the polarization axis of the lower polarizer); and as for the transmissive regions, the linearly polarized light in the y direction is also in the y direction after running through the liquid crystal molecules and cannot run through the upper polarizer of which the polarization axis is in the x direction, so the light from the backlight cannot run through the upper polarizer as well, and hence the dark state can be achieved.

Figure 9:
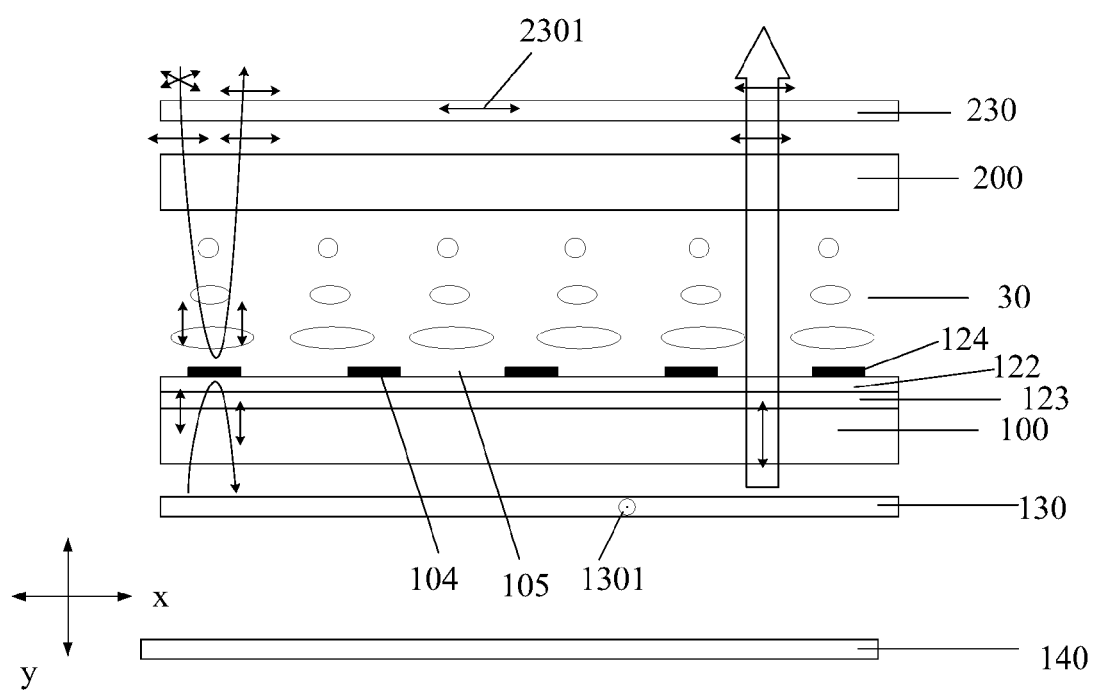
FIG. 9 is a schematic diagram of a method for achieving bright state in the ADS mode display panel or display device provided by one embodiment of the present invention.

The method for achieving bright state is as shown in FIG. 9.

When voltage is applied to the liquid crystal cell, liquid crystal molecules will rotate along the x-y plane. Supposing that the phase delay of liquid crystal molecules in the brightest state is λ/2.

As for the reflective region, natural light will be converted into linearly polarized light in the x direction after running through the upper polarizer from the top down, and the linearly polarized light in the x direction will be converted into linearly polarized light in the y direction after running through the liquid crystal molecules. The linearly polarized light in the y direction cannot run through the WGP in the reflective region and is reflected and converted into linearly polarized light in the x direction after running through the liquid crystal molecules again, and the linearly polarized light in the x direction can run through the upper polarizer, so that the bright state is achieved. As for the transmissive region, the linearly polarized light in the y direction can run through the transmissive region and can run through the lower polarizer and arrive at the backlight.

As for the transmissive region, as the same with the conventional technology, as for the light from the backlight, the light from the backlight is converted into linearly polarized light in the y direction after running through the lower polarizer. The linearly polarized light in the y direction can run through the transmissive region and is converted into linearly polarized light in the x direction after running through the liquid crystal molecules, and the linearly polarized light in the x direction can run through the upper polarizer and run through the liquid crystal cell, and hence the bright state is achieved. When the light from the backlight arrives at the reflective region, the linearly polarized light in the y direction cannot run through the WGP in the reflective region and is reflected.

The transmissive regions achieve display via backlight emission, and the reflective regions achieve display by reflecting the ambient light. Thus, bright-state display can be achieved. It should be noted that although FIG. 8 illustrates the ADS mode array substrate in which the WGP is multiplexed as the pixel electrode, the methods for achieving the bright state and the dark state are not limited to this case. Other modes or cases provided by the embodiment of the present invention may also refer to the methods for achieving the bright state and the dark state.

In the embodiment of the present invention, each subpixel includes the plurality of transmissive regions and the plurality of reflective regions, so the transflective display panel and display device comprising the array substrate provided with the subpixels of this type have more uniform brightness and good overall uniformity.

For instance, the transflective display mode can be achieved by the arrangement of the WGP in the reflective regions, so that the transflective display panel and display device having the advantages of single cell gap, no additional compensating film, more uniform brightness and good overall uniformity can be obtained.

For instance, the transmissive regions and the reflective regions may be alternately arranged, and the transmissive regions 105 and the reflective regions 104 may be alternately arranged in the first direction. In addition, the transmissive regions 105 and the reflective regions 104 may also be alternately arranged in the second direction which is perpendicular to the first direction. Thus, the brightness distribution uniformity of the display panel comprising the array substrate provided with the transmissive regions and the reflective regions of this type can be more improved.

Moreover, the WGP may be multiplexed as the pixel electrode. Or the WGP and the gate line or the data line may also be arranged in the same layer, and the WGP is manufactured without the addition of a new patterning process on the basis of the conventional manufacturing process of the array substrate, so the number of the applied masks and the manufacturing process can be reduced, and hence the manufacturing cost can be reduced and the production efficiency can be improved.

The array substrate, the LCD panel and the display device provided by the embodiment of the present invention can achieve the transflective display mode having the advantages of more uniform brightness, good overall uniformity, wide viewing angle, single cell gap, simple process and no additional compensating film. Thus, the problem of poor viewing angle in the conventional transflective mode can be solved.

Compared with the conventional single-cell-gap ECB mode and double-cell-gap transflective mode, the display panel and the display device provided by the embodiment of the present invention have the advantages of simpler structure, no additional compensating film and capability of achieving wide viewing angle display.

It should be noted that:

(1) Unless otherwise specified, the technical terms or scientific terms used herein should have normal meanings understood by those skilled in the art. The words "first", "second" and the like used in the disclosure do not indicate the sequence, the number or the importance but are only used for distinguishing different components.

(2) In the accompanying drawings of the embodiments of the present invention, the thickness of the film layers and the shape of the areas do not reflect the true scale of the array substrate and are only intended to illustrate the content of the embodiments of the present invention. It should be understood that when an element such as a layer, a film, an area and a substrate is disposed "above" or "below" another element, the element may be directly disposed "on" or "beneath" another element, or an intermediate element may be provided.

(3) The embodiments and the accompanying drawings of the present invention only involve the structures involved in the embodiments of the present invention, and other structures may refer to the conventional design on the basis of the disclosure.

(4) The embodiments of the present invention and the characteristics in the embodiments may be mutually combined without conflict.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The application claims priority to the Chinese patent application No. 201510483267.5, filed on Aug. 3, 2015, the disclosure of which is incorporated herein by reference as part of the application.

The invention claimed is:

1. An array substrate, comprising a base substrate and a plurality of subpixels disposed on the base substrate, wherein an area of each of the subpixels includes a plurality of transmissive regions and a plurality of reflective regions,
wherein each of the subpixels is provided with a wire grid polarizer (WGP); the WGP in each of the subpixels includes a plurality of groups of metal wires in parallel arrangement disposed in the plurality of reflective regions; each reflective region is provided with one group of metal wires in parallel arrangement; and the plurality of metal wires in parallel arrangement in the WGP are configured to transmit linearly polarized light with a polarization direction perpendicular to an extension direction of the metal wires and reflect linearly polarized light with a polarization direction parallel to the extension direction of the metal wires,
wherein, the array substrate further comprises:
a plurality of gate lines, wherein the WGP and the plurality of gate lines are arranged in a same layer and insulated from each other; and
common electrode lines which are arranged in a same layer and have a same extension direction with the gate lines, wherein the WGP in each of the subpixels is electrically connected with the common electrode lines.

2. The array substrate according to claim 1, wherein the transmissive regions and the reflective regions are alternately arranged in a first direction.

3. The array substrate according to claim 2, wherein the transmissive regions and the reflective regions are alternately arranged in a second direction which is perpendicular to the first direction.

4. The array substrate according to claim 1, wherein the plurality of transmissive regions and/or the plurality of reflective regions in the area of each of the subpixels are uniformly distributed in the each of the subpixels.

5. The array substrate according to claim 1, wherein the metal wires are made of at least one selected from the group consisted of aluminum, chromium, copper, silver, nickel, iron and cobalt.

6. The array substrate according to claim 1, further comprising a plurality of data lines, wherein the WGP and the plurality of data lines are arranged in a same layer and insulated from each other.

7. The array substrate according to claim 1, wherein the WGP in each of the subpixels is electrically connected with a pixel electrode in the each of the subpixels.

8. The array substrate according to claim 1, further comprising a thin film transistor, wherein the WGP is multiplexed as a pixel electrode in each of the subpixels; and the pixel electrode is electrically connected with a drain electrode of the thin film transistor.

9. The array substrate according to claim 8, wherein the pixel electrode in each of the subpixels is a slit electrode or a comb electrode.

10. The array substrate according to claim 1, wherein the WGP in each of the subpixels is multiplexed as a common electrode in the each of the subpixels.

11. The array substrate according to claim 10, wherein the common electrode in the each of the subpixel is a slit electrode.

12. The array substrate according to claim 1, wherein the WGP is multiplexed as a pixel electrode and a common electrode being arranged in a same layer and having an interdigital structure.

13. The array substrate according to claim 1, wherein in each of the subpixels, a transparent metal oxide conductive layer is disposed on the WGP.

14. The array substrate according to claim 13, wherein in each of the subpixels, the transparent metal oxide conductive layer and the WGP have a same pattern.

15. A liquid crystal display (LCD) panel, comprising: an array substrate and a counter substrate which are arranged opposite to each other, and a liquid crystal layer filled between the array substrate and the counter substrate, wherein
the array substrate is the array substrate according to claim 1.

16. A display device, comprising the LCD panel according to claim 15.

* * * * *